(12) United States Patent
Schuppert et al.

(10) Patent No.: US 12,214,761 B2
(45) Date of Patent: Feb. 4, 2025

(54) ELECTROPNEUMATIC PARKING-BRAKE VALVE UNIT

(71) Applicant: ZF CV Systems Europe BV, Brussels (BE)

(72) Inventors: Fabian Schuppert, Wunstorf (DE); Rudolf Dückmann, Isernhagen (DE); Hauke Kraus, Seelze (DE)

(73) Assignee: ZF CV Systems Europe BV, Brussels (BE)

( * ) Notice: Subject to any disclaimer, the term of this patent is extended or adjusted under 35 U.S.C. 154(b) by 471 days.

(21) Appl. No.: 17/694,246

(22) Filed: Mar. 14, 2022

(65) Prior Publication Data

US 2022/0194340 A1  Jun. 23, 2022

Related U.S. Application Data

(63) Continuation of application No. PCT/EP2020/074281, filed on Sep. 1, 2020.

(30) Foreign Application Priority Data

Sep. 25, 2019 (DE) .................... 10 2019 125 747.6

(51) Int. Cl.
*B60T 13/38* (2006.01)
*B60T 13/68* (2006.01)
(Continued)

(52) U.S. Cl.
CPC .......... *B60T 13/385* (2013.01); *B60T 13/683* (2013.01); *B60T 17/002* (2013.01); *B60T 17/085* (2013.01); *G05D 16/2093* (2013.01)

(58) Field of Classification Search
None
See application file for complete search history.

(56) References Cited

U.S. PATENT DOCUMENTS

2009/0184568 A1   7/2009   Bensch et al.
2010/0025141 A1   2/2010   Bensch et al.
(Continued)

FOREIGN PATENT DOCUMENTS

CN   101600611 A   12/2009
CN   101959727 A    1/2011
(Continued)

OTHER PUBLICATIONS

DE-102018102764-A1 Machine Translation (Year: 2019).*
(Continued)

*Primary Examiner* — Melanie Torres Williams
(74) *Attorney, Agent, or Firm* — Walter Ottesen, P.A.

(57) ABSTRACT

An electropneumatic parking-brake valve unit for an electronically controlled pneumatic brake system has a first supply connection to a compressed air source. A spring brake connection connects to a spring brake cylinder of a vehicle. A parking-brake valve arrangement has a bistable valve switchable between switching states wherein a spring brake pressure can be controllable in dependence upon the switching state. A pneumatically switchable holding valve has a holding-valve connection for a first control pressure and the holding valve is connected between the first supply connection and the bistable valve. The holding valve is under a spring load into a first switching position wherein the bistable valve is connected to a deaerator. The bistable valve switches into a second switching position when the first control pressure exceeds a first threshold value. The bistable valve is connected to the first supply connection.

16 Claims, 4 Drawing Sheets

(51) Int. Cl.
    *B60T 17/00*      (2006.01)
    *B60T 17/08*      (2006.01)
    *G05D 16/20*      (2006.01)

(56) References Cited

U.S. PATENT DOCUMENTS

| | | |
|---|---|---|
| 2010/0187902 A1 | 7/2010 | Bensch et al. |
| 2011/0062774 A1 | 3/2011 | Bensch et al. |
| 2011/0303501 A1 | 12/2011 | Hilberer et al. |
| 2014/0103237 A1 | 4/2014 | Herges |
| 2018/0251112 A1 | 9/2018 | Griesser et al. |

FOREIGN PATENT DOCUMENTS

| | | | |
|---|---|---|---|
| CN | 105383467 A | 3/2016 | |
| CN | 109476296 A | 3/2019 | |
| DE | 10 2005 058 799 A1 | 6/2007 | |
| DE | 10 2011 101 438 A1 | 11/2012 | |
| DE | 10 2013 005 896 A1 | 10/2014 | |
| DE | 10 2015 119 136 A1 | 5/2017 | |
| DE | 102018102764 A1 * | 8/2019 | ............ B60T 13/268 |
| EP | 2121397 B1 * | 5/2013 | ............ B60T 13/261 |
| EP | 2 998 177 A1 | 3/2016 | |
| WO | 2008/122382 A1 | 10/2008 | |

OTHER PUBLICATIONS

EP-2121397-B1 Machine Translation (Year: 2013).*
Translation of Written Opinion of the International Searching Authority dated Nov. 18, 2020 for international application PCT/EP2020/074281 on which this application is based.
International Search Report of the European Patent Office dated Nov. 18, 2020 for international application PCT/EP2020/074281 on which this application is based.

* cited by examiner

ELECTROPNEUMATIC PARKING-BRAKE VALVE UNIT

CROSS REFERENCE TO RELATED APPLICATIONS

This application is a continuation application of international patent application PCT/EP2020/074281, filed Sep. 1, 2020 designating the United States and claiming priority from German application 10 2019 125 747.6, filed Sep. 25, 2019, and the entire content of both applications is incorporated herein by reference.

TECHNICAL FIELD

The disclosure relates to an electropneumatic parking-brake valve unit for an electronically controlled pneumatic brake system of a vehicle, in particular a utility vehicle, having at least a first supply connection for receiving supply pressure from a compressed-air source, at least one spring brake connection for the connection of at least one spring brake cylinder of the vehicle, a parking-brake valve arrangement having at least a first bistable valve, wherein a spring brake pressure can be output at the spring brake connection according to the switching of the first bistable valve. The disclosure furthermore relates to an electropneumatic parking-brake module having such an electropneumatic parking-brake valve unit and an air-conditioning module, a method for operating an electronically controlled electropneumatic brake system of a vehicle and a vehicle.

BACKGROUND

Electropneumatic parking-brake valves of the above-mentioned type are known and are used in utility vehicles in order to maintain braking of the utility vehicle in a parked state. To this end, utility vehicles generally have so-called spring brake cylinders, which may also be part of a combination cylinder, also referred to as a tristop cylinder. Such spring brake cylinders have a spring, which ensures that the spring brake cylinder is applied in the deaerated state, whereas it can be released in opposition to the spring force by feeding air to a chamber. This means that these spring brake cylinders must be deaerated to engage the parking brake. Such spring brake cylinders are conventionally provided at least at the rear axle of the utility vehicle. However, they can also be additionally provided at the front axle. It is also conventional that trailers for utility vehicles have similar systems and are provided with a corresponding in order to engage, or release, the corresponding spring brake cylinders of the trailer.

So-called bistable valves have proven useful for constantly maintaining the aerated state of the spring brake cylinders whilst driving, without a monostable valve having to be continuously aerated for this purpose. Bistable valves have two stable switching states, that is, two switching states which can be maintained in a de-energized state. The application of a voltage is only required to change from one switching state to the other. It is thus possible, when starting the vehicle, to switch the bistable valve to the appropriate state in which it then remains so that the spring brake cylinders remain aerated whilst driving.

In certain critical fault situations of such an electronically controlled, pneumatic brake system, such spring brake cylinders can also be used as additional brakes. In this case, for example, the service brakes of the utility brake continue to be operated, wherein air for operating the service brakes is taken from the spring brake cylinders. It is also conceivable to use the spring brake cylinders instead of the service brakes to brake the vehicle. In both cases, in spite of the fault, the vehicle can still be braked in a controlled manner and ultimately comes to a standstill.

In this case, however, it has proven problematic that, in such a case, the bistable valve still remains in the position required to aerate the spring brake cylinders. If the vehicle is now started again after the fault, situations may arise in which the service brakes of the vehicle are not yet actuated but, owing to the renewed provision of compressed air and the bistable valve being switched to "drive", the spring brake cylinders are already released. In this case, the vehicle would not be braked in a controlled manner and might roll away.

SUMMARY

An object of the present disclosure is to at least partially eliminate this problem and, especially, prevent the vehicle from rolling away in an uncontrolled manner after a significant electrical fault.

In a first aspect of the electropneumatic parking-brake valve unit mentioned at the outset, the disclosure solves the problem via a pneumatically switchable holding valve having a holding-valve control connection, which is connected between the first supply connection and the first bistable valve and is pre-tensioned under a spring load into a first switching position, in which the first bistable valve is connected to a deaerator, and which, when a first control pressure provided at the holding-valve control connection is exceeded, switches to a second switching position, in which the first bistable valve is connected to the first supply pressure connection for the purpose of receiving supply pressure. As a result of the holding valve, the bistable valve can only be supplied with supply pressure, and consequently can only transfer supply pressure to the spring brake cylinders, when the holding valve is in the second switching position. However, the holding valve is only in the second switching position when the first control pressure provided at the holding-valve control connection exceeds a first threshold value. The first control pressure can preferably be provided by a further module which, by way of example and preferably, only conducts pressure when service brakes of the vehicle are active. Only then can the spring brake cylinders be deaerated in such a case, since only then can the bistable valve be supplied with supply pressure irrespective of its switching state. A safety measure is thus created for the electropneumatic parking-brake valve unit, which can prevent the vehicle from rolling away in an uncontrolled manner.

According to a first embodiment, the holding valve has a first holding-valve connection connected to the first supply connection, a second holding-valve connection connected to the first bistable valve and a third holding-valve connection connected to the deaerator. The holding valve can therefore be configured as a pneumatically switchable 3/2-way valve, which connects the bistable valve alternately to the supply connection and the deaerator.

It is further preferred that the first control pressure is output by an electrically switchable control valve, which is part of the electropneumatic parking-brake valve unit, or is arranged remotely from this. By way of example, the control valve can be integrated with the parking-brake valve unit in a common module, or it can be part of an adjacent module. The control valve can be provided specifically for this purpose, or it can be a valve of a further unit, for example a trailer control valve, an air-conditioning system, a multi-circuit protection valve or the like, which is present in any case. The electrically switchable control valve is then preferably only switched when service brakes of the utility vehicle are active.

In an embodiment, the control valve has a first control-valve connection, which is connected to a pneumatic line which conducts pressure at least during the operation of the utility vehicle, a second control-valve connection, which is connected to the holding-valve control connection, and a third control-valve connection, which is connected to a or the deaerator, wherein the control valve connects the second control-valve connection to the third control-valve connection in a de-energized state. It can thus be ensured that pressure can be transferred to the holding valve via the control valve during the operation of the utility vehicle in order to switch the holding valve accordingly. It is not imperative that the control valve is connected directly to a supply. Instead, it is sufficient to provide a pressure-conducting pneumatic line in order to provide this pressure, since only a control pressure has to be transferred to the holding-valve control connection by the control valve. The electropneumatic parking-brake valve unit can thus be integrated in the brake system in a particularly simple manner, without greatly increasing the complexity of the pipe system.

In an embodiment, the electropneumatic parking-brake valve unit has a holding-valve return line, which provides a pressure as a second control pressure at the holding-valve control connection, which pressure is output to the first bistable valve by the holding valve. Self-holding of the holding valve can thus be achieved. If the holding valve has switched once and feeds through the supply pressure associated with the first holding-valve connection, this supply pressure is returned via the holding-valve return line so that the holding valve remains switched. In this case, the holding valve can remain in the second switching position so that the spring brake cylinders can remain aerated, even if there is no control pressure output by the control valve and irrespective of the switching position of the control valve.

The parking-brake valve arrangement can preferably have a pilot unit having the first bistable valve for the purpose of providing at least a first pilot pressure and a main valve unit, which receives the first pilot pressure and outputs the parking-brake pressure in accordance with the receipt of the first pilot pressure. In this case, the bistable valve is only used to provide the pilot pressure, and not the volume pressure, in order to actually aerate the spring brake cylinder.

To this end, a first 2/2-way valve can preferably be provided in the pilot unit, which 2/2-way valve is associated with the first bistable valve and has a first 2/2-way valve connection connected to the first bistable valve and a second 2/2-way valve connection connected to the main valve unit for the purpose of providing the first pilot pressure at the main valve unit. The first 2/2-way valve is preferably open in a de-energized state and in a closed switching position in an energized state. The spring brake pressure provided at the spring brake connection can thus be introduced or removed in stages, without switching the bistable valve back and forth for this purpose.

To convert the first pilot pressure provided by the pilot unit into a volume pressure, the main valve unit preferably can have at least a first relay valve, which has a first relay-valve supply connection receiving the supply pressure, a first relay-valve working connection connected to the spring brake connection, a first relay-valve deaeration connection connected to a or the deaerator and a first relay-valve control connection connected to the pilot unit and receiving the first pilot pressure. The relay valve is configured in a conventionally known manner and converts the control pressure received at the first relay-valve control connection into a volume pressure, which is output at the first relay-valve control connection and provided at the spring brake connection.

It is further preferred that the electropneumatic parking-brake valve unit has a release connection for manually providing a release pressure for manually outputting the spring brake pressure. Via such a release connection, pressure which can then be provided at the spring brake connection can be output manually, for example via a pump or the like. Such a function is also referred to as an anti-compound connection and, following a fault owing to a so-called pumping down or depletion of the pressure present in the spring brake cylinders, can be used in particular to release this pressure again. In the event that the spring brake cylinders are applied after a significant electronic fault has occurred and the vehicle cannot be started again, the spring brake cylinders might otherwise not be released again.

In a further embodiment, the pilot unit has a second bistable valve for providing a second pilot pressure at the main valve unit, wherein the main valve unit receives the second pilot pressure and outputs a trailer pressure at a trailer connection in accordance with the receipt of the second pilot pressure for the purpose of releasing spring brakes of a trailer connected to the vehicle. An independent pressure, namely the trailer pressure, and not the spring brake pressure, can preferably be transferred to the trailer. The trailer can thus be controlled and braked independently of the tractor. Both systems can nevertheless be accommodated in the same pilot unit and the same main valve unit, and in particular can also be controlled by a common control (ECU).

In accordance with this, the main valve unit can preferably have a second relay valve, which has a second relay-valve supply connection receiving the supply pressure, a second relay-valve working connection, connected to the trailer connection, a second relay-valve deaeration connection connected to a or the deaerator and a second relay-valve control connection connected to the pilot unit and receiving the second supply pressure. The second relay valve can be configured in the manner of the first relay valve.

In a second aspect, the disclosure achieves the object mentioned at the outset via an electropneumatic parking-brake module having an electropneumatic parking-brake valve unit according to one of the above-described preferred embodiments of an electropneumatic parking-brake valve unit according to the first aspect of the disclosure, and a multi-circuit protection valve unit, which is connected upstream of the electropneumatic parking-brake valve unit in relation to the compressed-air source, wherein the multi-circuit protection valve unit provides the first control pressure. A particularly preferred and simple option for providing the first control pressure is thus achieved. Only when the entire compressed-air supply is increased and the multi-circuit protection valve is supplied with compressed air can the service brakes also be actuated. Only at this time is the first control pressure then provided by the multi-circuit protection valve unit, so that the electropneumatic parking-brake valve unit is then also supplied with supply pressure in order to be able to consequently release the spring brake cylinders. A separate circuit or the provision of a separate valve is not necessary in this case. The first control pressure is diverted from the multi-circuit protection valve unit in a simple manner.

The electrically switchable control valve can preferably be a valve of the multi-circuit protection valve unit. The function of the electropneumatic parking-brake valve unit is thus further branched with the multi-circuit protection valve unit and dependent on this. The safety can thus be further increased and the utility vehicle is prevented from rolling away in an uncontrolled manner after it is started.

The control valve in the multi-circuit protection valve unit can preferably serve to enable a restricted return flow of dry regeneration air from the system volume during a regeneration phase of an air dryer. Such a return flow only takes place when the air dryer is deaerated. At a normal pressure level, a pilot control of the holding valve can therefore be achieved by the same switching procedure. This is a particularly preferred configuration of the connection between the electropneumatic parking-brake valve unit and the multi-circuit protection valve unit.

In a further configuration of the electropneumatic parking-brake module, a trailer control unit is integrated in the parking-brake module. The integration of such components can thus be further increased. It is, in particular, possible to control the electropneumatic parking-brake valve unit and the trailer control unit via common intelligence, whereby it is possible to save on electronic contra units overall.

According to a third aspect, the disclosure achieves the object mentioned at the outset via an air-conditioning module, including a parking-brake module according to one of the above-described embodiments of an electropneumatic parking-brake module according to the second aspect of the disclosure and an air-conditioning unit. The air-conditioning unit and the electropneumatic parking-brake module can preferably be integrated together in the air-conditioning module. In this aspect, synergies between the individual elements can also be enhanced so that the system is improved overall.

In a fourth aspect, the disclosure achieves the object mentioned at the outset via a method for operating an electronically controlled pneumatic brake system of a vehicle, in particular a utility vehicle, having an electropneumatic parking-brake valve unit. The electropneumatic parking-brake valve unit has at least a first supply connection for receiving supply pressure from a compressed-air source, at least one spring brake connection for the connection of at least one spring brake cylinder of the vehicle and a parking-brake valve arrangement having at least a first bistable valve, wherein a spring brake pressure can be output at the spring brake connection according to the switching of the first bistable valve. The method includes the steps:

determining a fault in the brake system, which prevents switching of the first bistable valve; deaerating the first spring brake connection for stopping the vehicle; and connecting at least two connections of the first bistable valve to a deaerator for preventing the output of the spring brake pressure after deaeration of the spring brake connection has taken place. Deaeration of the spring brake cylinders is thus ensured irrespective of the switching of the bistable valve. After eliminating the fault and after switching the bistable valve to one of the two switching positions, the spring brake cylinders also remain deaerated when starting the vehicle. Only when one of the two connections of the bistable valve which were hitherto connected to a deaerator are aerated again, in particular by connecting this connection to a further valve, for example and preferably a holding valve which then supplies pressure to this connection, can the spring brake cylinders be aerated again. Within the scope of the method, the electropneumatic parking-brake valve unit can preferably be configured according to one of the above-described embodiments of an electropneumatic parking-brake valve unit according to the first aspect of the disclosure.

In a fifth aspect of the disclosure, the object mentioned at the outset is achieved by a vehicle, in particular a utility vehicle, having an electronically controlled pneumatic brake system having an electropneumatic parking-brake valve unit according to one of the above-described embodiments of an electropneumatic parking-brake valve unit according to the first aspect of the disclosure. For further advantages and developments, please also refer here to the description relating to the first aspect of the disclosure and also to the second and third aspect of the disclosure in its entirety.

Embodiments of the disclosure are now described below with reference to the drawings. These are not necessarily intended to be drawn to scale; rather, the drawings have a schematic and/or slightly distorted form if this is useful for explanatory purposes. In terms of additions to the teaching which can be identified directly from the drawing, please refer to the appropriate prior art. In this case, it should be taken into account that various modifications and changes relating to the form and detail of an embodiment can be undertaken without deviating from the general idea of the disclosure.

BRIEF DESCRIPTION OF THE DRAWINGS

The invention will now be described with reference to the drawings wherein.

DESCRIPTION OF THE PREFERRED EMBODIMENTS

Figure 1:
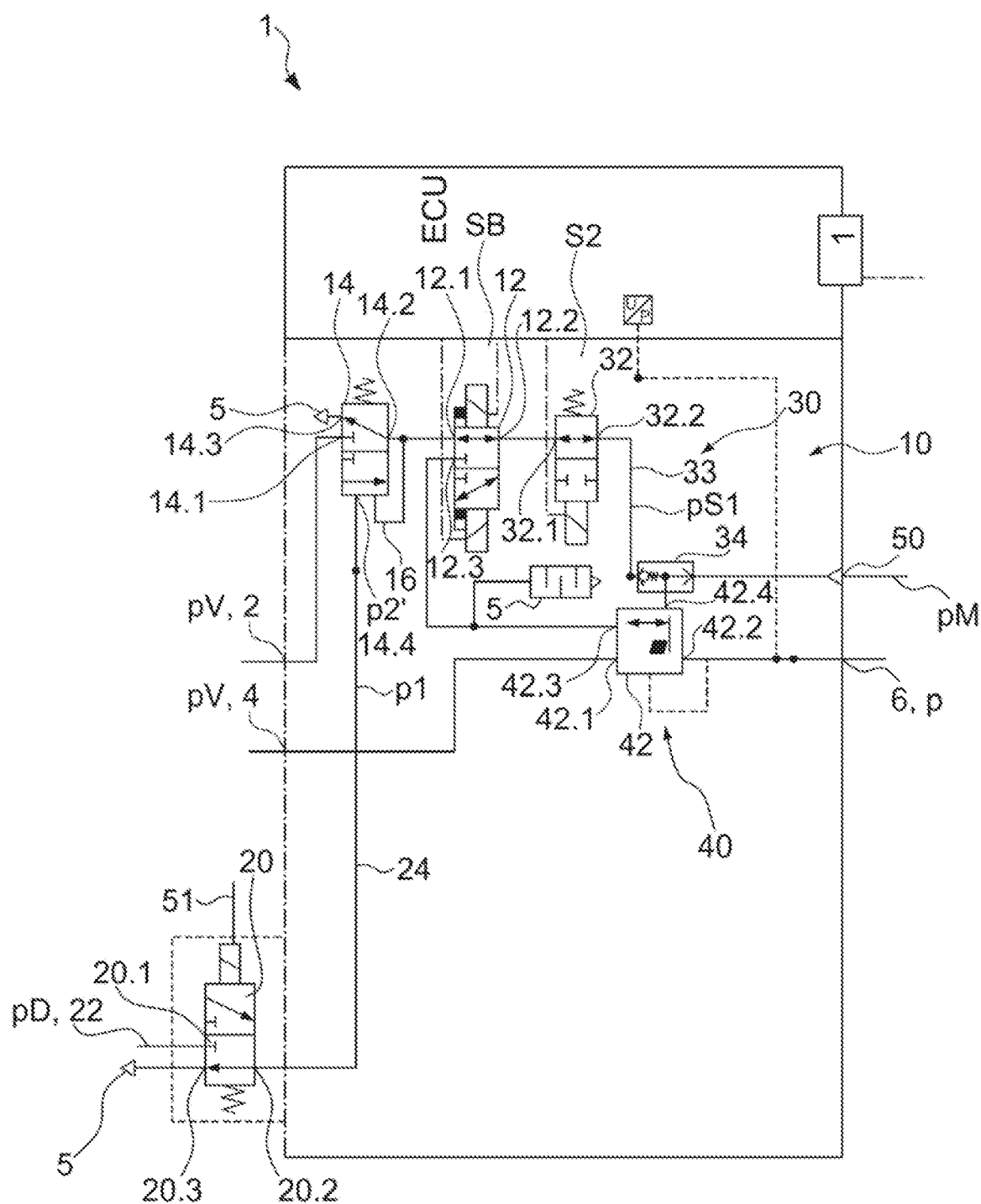
FIG. 1 shows a circuit arrangement of an electropneumatic parking-brake valve unit according to the first aspect of the disclosure.

In the drawings, the same reference numerals and/or characters are used for identical or similar parts or parts having an identical or similar function.

An electropneumatic parking-brake valve unit 1 has a first supply connection 2, via which the electropneumatic parking-brake valve unit 1 receives supply pressure pV. The supply pressure pV can be provided by a compressed-air supply (not shown) or can come directly from the air-conditioning unit. The electropneumatic parking-brake unit 1 furthermore has at least one spring brake connection 6 for the connection of at least one spring brake cylinder (not shown here). More than one spring brake cylinder can also be connected to the spring brake connection 6, namely in particular two or four, which are provided at a rear axle of the vehicle. The electropneumatic parking-brake valve unit 1 is configured to provide a spring brake pressure pF at the spring brake connection 6. When a spring brake pressure pF is present, that is, when the spring brake connection 6 is aerated, the correspondingly connected spring brake cylinders are released; conversely, they are applied when the spring brake connection 6 is deaerated.

In order to provide the spring brake pressure pF, the electropneumatic parking-brake valve unit 1 has a parking-brake valve arrangement 10. The parking-brake valve arrangement 10 has a plurality of valves, namely in particular a first bistable valve 12. The first bistable valve 12 has a first and a second switching position, wherein the spring brake pressure pF is output or not output according to the switching positions of the first bistable valve 12. The two switching positions of the first bistable valve 12 are stable, that is, they are also maintained in the de-energized state This is generally realized in that two corresponding end magnets are provided, which hold the armature in the end positions in a stable manner. The first bistable valve 12 has a first bistable-valve connection 12.1, a second bistable-valve connection 12.2 and a third bistable-valve connection 12.3. In the first switching position (shown in FIG. 1), the first bistable-valve connection 12.1 is connected to the second bistable-valve connection 12.2. In the second switching position (not shown in FIG. 1), the second bistable-valve connection 12.2 is connected to the third bistable-valve connection 12.3. The third bistable-valve connection 12.3 is connected to a deaerator 5, which, as a central deaerator, forms the electropneumatic parking-brake valve unit 1, or it can be provided separately therefrom. In the second switching position (not shown in FIG. 1), the second bistable-valve connection 12.2 is therefore deaerated.

A pneumatically switchable holding valve 14 is connected between the first bistable valve 12 and the first supply connection 2. The pneumatically switchable holding valve 14 has a first holding-valve connection 14.1, a second holding-valve connection 14.2, a third holding-valve connection 14.3 and a holding-valve control connection 14.4. The holding valve is monostable and preloaded into the first switching position shown in FIG. 1. In the first switching position (shown in FIG. 1), the third holding-valve connection 14.3 is connected to the second holding-valve connection 14.2. The third holding-valve connection 14.3 is in turn connected to a deaerator 5, so that the second holding-valve connection 14.2 is deaerated. The second holding-valve connection 14.2 is connected to the first bistable-valve connection 12.1. In the switching position shown in FIG. 1, the first bistable-valve connection 12.1 is therefore connected to the deaerator 5 via the holding valve 14, so that the second bistable-valve connection 12.2 is deaerated irrespective of the switching position of the first bistable valve 12. The output of a spring brake pressure pF is not possible in this case. The spring brake connection 6 remains deaerated irrespective of the switching position of the first bistable valve 12.

In order to bring the holding valve 14 into the second switching position (not shown in FIG. 1), in which the first holding-valve connection 14.1 is connected to the second holding-valve connection 14.2, wherein the first holding-valve connection 14.1 is connected to the supply connection 2, a control valve 20 is provided according to the embodiment shown here. The control valve 20 is configured as an electrically switchable 3/2-way valve, which has a first control-valve connection 20.1, a second control-valve connection 20.2 and a third control-valve connection 20.3. The first control-valve connection 20.1 is connected to a pressure-conducting line 22, which will be described in more detail below. The pressure-conducting line 22 conducts an operating pressure pD continuously during operation. The operating pressure pD is preferably only present when service brakes of the vehicle can also be supplied with pressure. In the first switching position (shown in FIG. 1) of the control valve 20, the third control-valve connection 20.3 is connected to the second control-valve connection 20.2. The third control-valve connection 20.3 is connected to a or the deaerator 5, the second control-valve connection 20.2 is connected to a first control-pressure line 24, which is in turn connected to the holding-valve control connection 14.4. This means that, in the first switching position (rest position) (shown in FIG. 1), the holding-valve control connection 14.4 is deaerated and the holding valve 14 is consequently in the first switching position (shown in FIG. 1). If the control valve 20 is now switched to the second position (not shown in FIG. 1), in particular as a result of providing a first switching signal S1, the operating pressure pD is fed through by the control valve 20 and provided as a first control pressure p1 at the holding-valve control connection 14.4. As soon as this pressure exceeds a first threshold value, the holding valve 14 switches to the second switching position (not shown in FIG. 2), in which the third holding-valve connection 14.3 is connected to the second holding-valve connection 14.2 so that the supply pressure pV is fed through the holding valve 14 by the first supply connection 2 and provided at the first bistable valve 12.

The first bistable valve 12 and the holding valve 14 are part of a pilot unit 30. The pilot unit 30 outputs a first pilot pressure pS1 overall, which is then provided at a main valve unit 40. In addition to the bistable valve 12 and the holding valve 14, the pilot unit in the embodiment shown in FIG. 1 additionally has a first 2/2-way valve 32. The 2/2-way valve 32 has a first 2/2-way valve connection 32.1 and a second 2/2-way valve connection 32.2. The first 2/2-way valve connection 32.1 is connected to the first bistable valve 12, more precisely to the second bistable-valve connection 12.2. The 2/2-way valve 32 is pre-tensioned under a spring load into a first, open switching position (shown in FIG. 1) and can be closed through energization. The second 2/2-way valve connection 32.2 is connected to a shuttle valve 34 via a corresponding pneumatic line 33. The shuttle valve 34 is then in turn connected to a first relay valve 42, which is part of the main valve unit 40. The first pilot pressure pS1 is provided at the main valve unit 40 by the pilot unit 30 via the shuttle valve 34. The main valve unit 40 here consists of the first relay valve 42.

The first relay valve 42 has a first relay-valve supply connection 42.1, which, in FIG. 1, is connected to a second supply connection 4 at which supply pressure is likewise provided. However, the first relay-valve supply connection 42.1 could equally be connected to the first supply connection 2. Moreover, the first relay valve 42 has a first relay-valve working connection, at which the first relay valve 42 outputs the spring brake pressure pF. The first relay valve 42 furthermore has a first relay-valve deaeration connection 42.3, which is connected to the deaerator 5, and a first relay-valve control connection 42.4, which receives the first pilot pressure pS1. The first relay valve 42 then outputs the spring brake pressure pF at a corresponding level based on the supply pressure pV in accordance with the receipt of the first pilot pressure pS1.

The shuttle valve 34 is also connected to a release connection 50 in addition to the pneumatic line 33. A manual pressure pM can be supplied manually via the release connection 50 in order to be able to release the spring brakes in the event that the vehicle is parked and de-energized, that is, the spring brakes are engaged. The shuttle valve 34 is configured such that the higher pressure in each case, which is provided by the 2/2-way valve 32 or the release connection 50, is fed through at the first relay-valve control connection 42.4.

A return line 16 is furthermore provided in the pilot unit 30. The return line 16 branches off directly downstream of the second holding-valve connection 14.2 and returns the pressure output by the holding valve 14 at the second holding-valve connection 14.2 back to the holding-valve control connection 14.4. As a result, as soon as the holding valve 14 has switched to the second switching position (not shown in FIG. 1), this switching position can be maintained. This means that, during operation of the vehicle, the second switching position assumed by the holding valve 14 is maintained so long as supply pressure pV is provided at the first supply connection 2. During operation, the operation of the spring brakes can then only be regulated by the pilot unit 30 irrespective of the switching of the control valve 20.

As is furthermore revealed in FIG. 1, the pilot unit 30 is in particular controlled by a control ECU. The control ECU in particular provides a bistable signal SR at the bistable valve 12, and a second switching signal S2 at the 2/2-way valve 32. The 2/2-way valve 32 can then be operated in particular in a pulsed manner in order to aerate or deaerate the spring brake connection 6 in a pulsed manner. The control valve 20 does not necessarily have to be controlled by the control ECU, but can be controlled by another or superordinate control unit. The switching signal S1 can also be a derived switching signal, which is provided in particular by another module.

Figure 2:
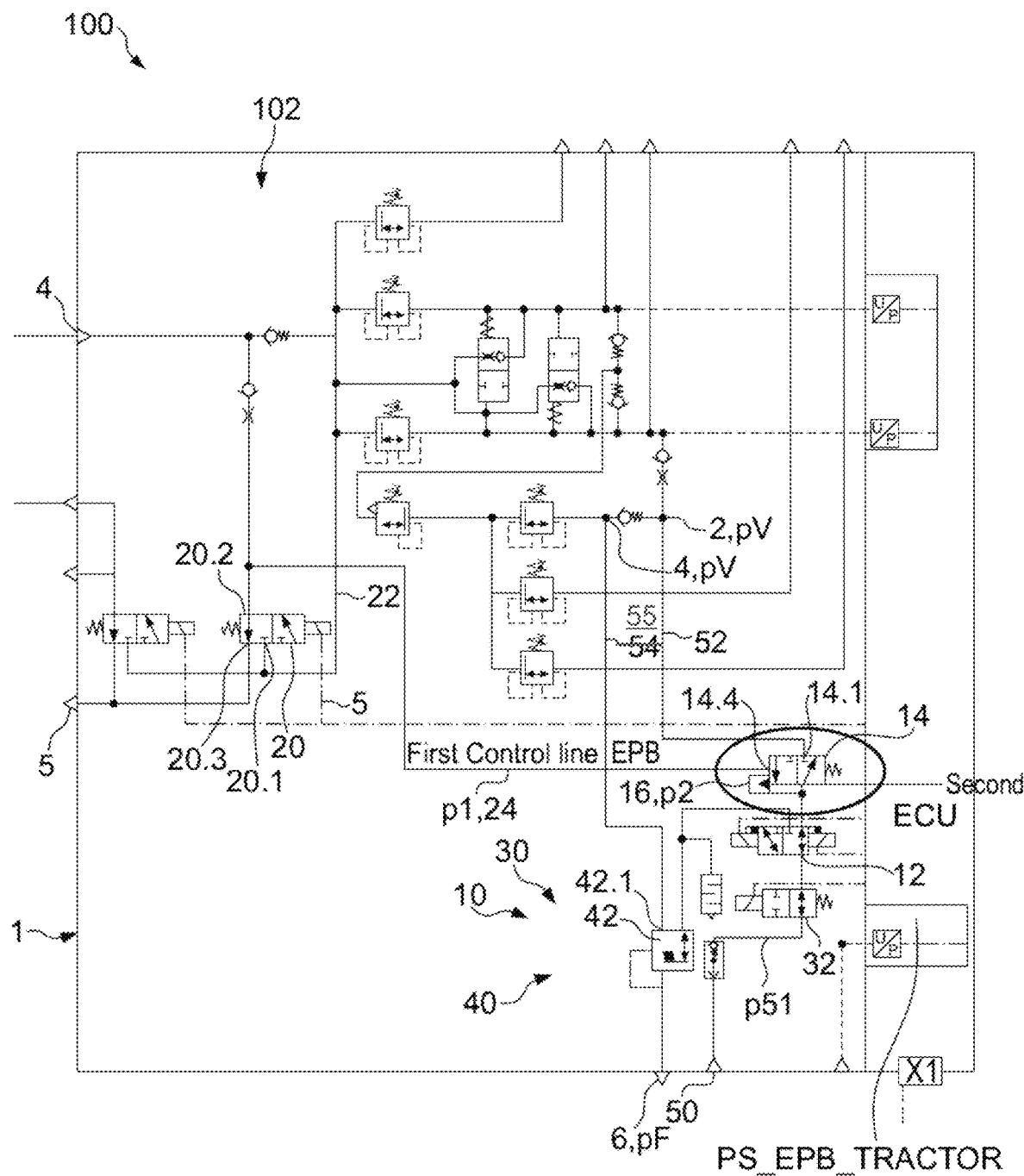
FIG. 2 shows a switching application of an electropneumatic parking-brake module according to the second aspect of the disclosure.
Figure 3:
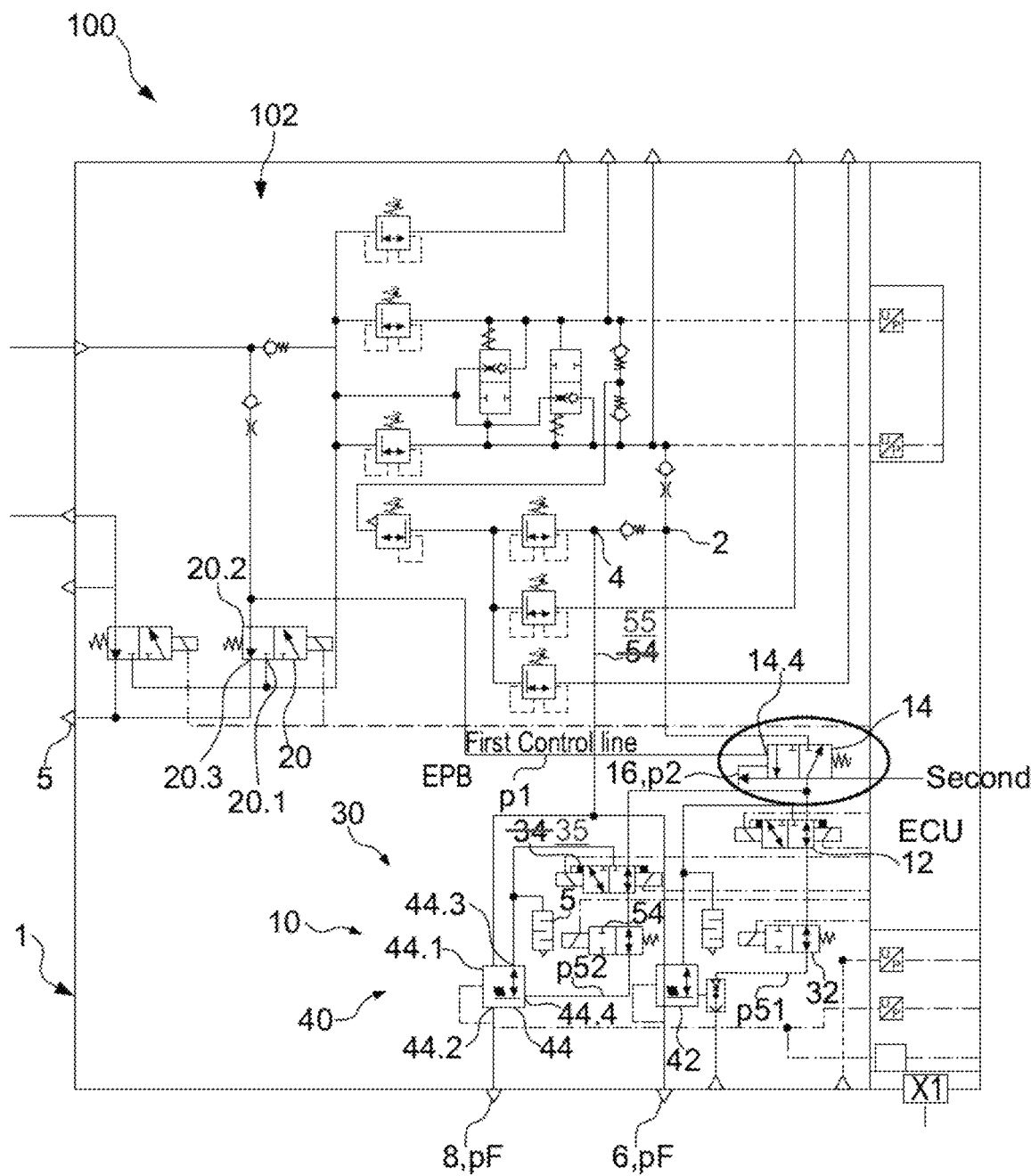
FIG. 3 shows the second embodiment of an electropneumatic parking-brake module; and, FIG. 4 shows a third embodiment of an electropneumatic parking-brake module having an integrated trailer control unit.

FIGS. 2 and 3 now illustrate an electropneumatic parking-brake module 100, which also has a multi-circuit protection valve unit 102 in addition to an electropneumatic parking-brake valve unit 1. Identical and similar elements are denoted by the same reference signs as the first embodiment. In this regard, please refer to the above description in its entirety and the differences will be explained in particular below.

The electropneumatic parking-brake valve unit 1 in turn has a spring brake connection 6, at which the spring brake pressure pF can be output. The pilot unit 30 and the main valve unit 40 are configured identically to the first embodiment according to FIG. 1. The pilot unit 30 more precisely includes the first bistable valve 12, the holding valve 14 and the 2/2-way valve 32. The main valve unit 40 includes the first relay valve 42.

The supply pressure pV is provided via the multi-circuit protection valve unit 102, which shall not be described in detail here. Multi-circuit protection valves are generally known. To provide the supply pressure pV, a first supply pressure line 52 branches off from the multi-circuit protection valve unit 102 and is connected to the first holding-valve connection 14.1. The point at which the first supply pressure line 52 branches off forms the first supply connection 2 in this case. A second supply pressure line 55 further branches off from the multi-circuit protection valve unit 102, which second supply pressure line leads to the first relay valve 42, more precisely to the first relay-valve supply connection 42.1. The second supply pressure line 55 branches off at a point which forms the second supply connection 4.

In addition to several valves and various connections, the multi-circuit protection valve unit 102 also has an inlet 104, which can be connected to the compressed-air conditioning system or the like. The multi-circuit protection valve unit 102 also has the control valve 20, which, within the framework of the multi-circuit protection valve unit 102, is used to enable a restricted return flow of dry regeneration air from the system volume during the regeneration phase of an air dryer. To this end, the control valve 20 can then be brought into the second switching position (not shown in FIG. 2). However, since, in this case, the line 22 which generally conducts pressure is connected via the control valve 20 to the second control-valve connection 20.2 from which the first control-pressure line 24 branches, the first control pressure p1 is provided at the holding valve 14 in the manner described above via this control-pressure line. The control valve 20 is controlled by the control ECU, which, in the embodiment shown in FIG. 2, is provided both for the multi-circuit protection valve unit 102 and for the electropneumatic parking-brake valve unit 1, so that they are controlled by the common control ECU.

FIG. 3 shows a further embodiment of the electropneumatic parking-brake module 100. Identical and similar elements are denoted by the same reference signs as the previous embodiments, so please refer to the above description in its entirety. The difference with respect to the first embodiment of the electropneumatic parking-brake module 100 (FIG. 2) is essentially described below.

The essential difference with respect to the embodiment according to FIG. 2 consists in that the electropneumatic parking-brake module 100 according to FIG. 2 is provided for utility vehicles without a trailer, and the electropneumatic parking-brake module 100 according to FIG. 3 is provided for utility vehicles with a trailer. In this regard, both the pilot unit 30 and the main valve unit 40 include a duplication of the necessary valves and the electropneumatic parking-brake module 100 furthermore includes a trailer connection 8, at which a trailer pressure pT can be provided in order to release or apply spring brakes of the trailer. The provision of the trailer pressure pT takes place analogously to the provision of the spring brake pressure pF. To this end, the pilot valve 30 has a second bistable valve 35 and a second 2/2-way valve 54, which are likewise connected in the manner of the first bistable valve 12 and the first 2/2-way valve 32. The main valve unit 40 furthermore has a second relay valve 44, which is likewise connected in the manner of the first relay valve 42. It therefore has a second relay-valve supply connection 44.1, which is likewise connected to the second supply pressure line 55 in the manner of the first relay-valve supply connection 42.1. It moreover has a second relay-valve working connection 44.2, which is connected to the trailer connection 8, a second relay-valve deaeration connection 44.3, which is connected to the deaerator 5, and a second relay-valve control connection 44.4, which is connected to the pilot unit 30, more precisely to the second bistable valve 35 via the second 2/2-way switching valve 54. The holding valve 14 is connected upstream of both the first bistable valve 12 and the second bistable valve 35. With respect to the holding valve 14, there is no further difference here in the control.

Figure 4:
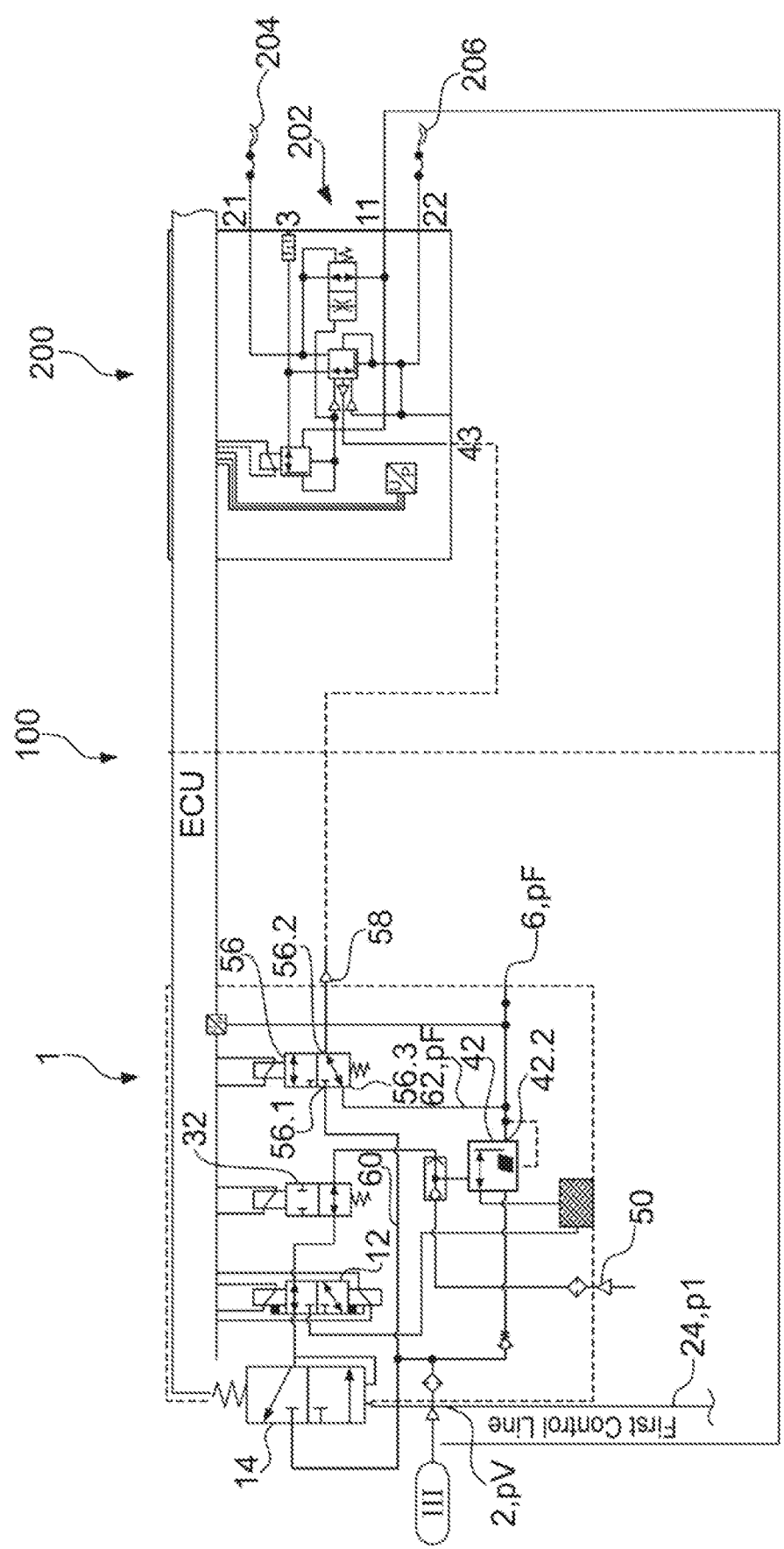

An electropneumatic parking-brake module 100 is now illustrated in FIG. 4, which, in addition to the electropneumatic parking-brake valve unit 1 and possibly also the multi-circuit protection valve unit 102 (c.f. FIG. 2, 3), additionally includes a trailer control unit 200. All three units, the electropneumatic parking-brake valve unit 1, the multi-circuit protection valve unit 102 and the trailer control unit 200, are integrated together in a module. For the sake of simplicity, the elements of the multi-circuit protection valve unit 102 are not shown in FIG. 4. Identical and similar elements are in turn denoted by the same reference signs, so please refer to the above description in its entirety. FIG. 4 is a schematic illustration and the integration is represented in particular by the commonly provided control ECU. The differences with respect to the first embodiments are discussed below.

The significant difference consists in the trailer control unit 200, which can be constructed in a manner which is fundamentally known. It has a trailer-control valve unit 202 with valves integrated therein, which shall not be described in detail here. The trailer control unit 200 moreover has a coupling head "brake" 204, and a coupling head "supply" 206. A control pressure for service brakes of the trailer is transferred via the coupling head "brake" 204, whilst a supply pressure for the trailer is transferred via the coupling head "supply" 206. The integration between the parking-brake valve unit 1 and the trailer control unit 200 is in particular advantageous when a so-called Scandinavian trailer control is to be implemented, or in the case of functionalities such as a trailer test position, anti-jackknife braking or additional braking. If spring brakes are used for particular functions in the tractor and the spring brake connection 6 is therefore deaerated, the service brakes shall be applied for such functionalities in trailers. To this end, the electropneumatic parking-brake valve unit 1 according to this fourth embodiment has a trailer valve 56, which is connected downstream of the first relay valve 42 and is connected to a trailer control connection 58. More precisely, the trailer valve 56 is configured as a 3/2-way valve and has a first trailer valve connection 56.1, a second trailer valve connection 56.2 and a third trailer valve connection 56.3. The first trailer valve connection 56.1 is connected to the first supply connection 2 via a supply branch line 60. The second trailer valve connection 56.2 is connected to the trailer control connection. The third trailer valve connection 56.3 is connected to a second branch line 62, which branches off between the first relay-valve working connection 42.2 and the spring brake connection 6, that is, it provides the spring brake pressure pF at the third trailer valve connection 56.3. Depending on the switching position of the trailer valve 56, either the supply pressure pV or the spring brake pressure pF can therefore be provided at the trailer control connection. Via a trailer control line 64, this pressure is then provided at the trailer control unit 200, possibly inverted there, in order to then also brake service brakes of the trailer accordingly based on the engagement of spring brakes of the tractor.

It is understood that the foregoing description is that of the preferred embodiments of the invention and that various changes and modifications may be made thereto without departing from the spirit and scope of the invention as defined in the appended claims.

LIST OF REFERENCE SIGNS (PART OF THE DESCRIPTION)

1 Electropneumatic parking-brake valve unit
2 First supply connection
4 Second supply connection
5 Deaerator
6 Spring brake connection
8 Trailer connection
10 Parking-brake valve arrangement
12 First bistable valve
12.1 First bistable-valve connection
12.2 Second bistable-valve connection
12.3 Third bistable-valve connection
14 Pneumatically switchable holding valve
14.1 First holding-valve connection
14.2 Second holding-valve connection
14.3 Third holding-valve connection
14.4 Holding-valve control connection
16 Return line
20 Control valve
20.1 First control-valve connection
20.2 Second control-valve connection
20.3 Third control-valve connection
22 Pressure-conducting line
24 First control-pressure line
30 Pilot unit
32 First 2/2-way valve
32.1 First 212-way valve connection
32.2 Second 2/2-way valve connection
33 Pneumatic line
34 Shuttle valve
35 Second bistable valve
40 Main valve unit
42 First relay valve
42.1 First relay-valve supply connection.
42.2 First relay-valve working connection
42.3 First relay-valve deaeration connection
42.4 First relay-valve control connection
44 Second relay valve
44.1 Second relay-valve supply connection
44.2 Second relay-valve working connection
44.3 Second relay-valve deaeration connection
44.4 Second relay-valve control connection
50 Release connection
52 First supply-pressure line
54 Second 2/2-way switching valve
55 Second supply pressure line
56 Trailer valve
56.1 First trailer valve connection
56.2 Second trailer valve connection
56.3 Third trailer valve connection
58 Trailer control connection
60 Supply branch line
62 Second branch line
64 Trailer control line
100 Electropneumatic parking-brake module
102 Multi-circuit protection valve unit
pV Supply pressure
pF Spring brake pressure
pD Operating pressure
p1 First control pressure
pS1 First pilot pressure
pT Trailer pressure
S1 First switching signal

What is claimed is:

1. An electropneumatic parking-brake valve unit for an electronically controlled pneumatic brake system of a vehicle including a utility vehicle, the electropneumatic parking-brake valve unit comprising:
at least a first supply connection for receiving supply pressure (pV) from a compressed air source;
at least one spring brake connection for connecting to at least one spring brake cylinder of the vehicle;
a parking-brake valve arrangement having at least a first bistable valve switchable between first and second switching states wherein a spring brake pressure (pF) can be controllable in dependence upon the switching state of said first bistable valve;
a pneumatically switchable holding valve having a holding-valve connection whereat a first control pressure (p1) is provided and said pneumatically switchable holding valve being connected between said first supply connection and said first bistable valve;

a deaerator;

said pneumatically switchable holding valve being pretensioned under a spring load into a first switching position wherein said first bistable valve is connected to said deaerator;

said first bistable valve being configured to switch into a second switching position when said first control pressure (p1) at said holding-valve connection exceeds a predetermined first threshold value;

wherein said first bistable valve is connected to said first supply connection to receive said supply pressure (pV) in response to being switched into said second switching position; and, wherein said first control pressure (p1) is controlled by an electrically switchable control valve which is part of the electropneumatic parking-brake valve unit or is arranged remotely therefrom.

2. The electropneumatic parking-brake valve unit of claim 1, wherein said holding valve has a first holding-valve connection connected to said first supply connection, a second holding-valve connection connected to said first bistable valve and a third holding-valve connection connected to said deaerator.

3. The electropneumatic parking-brake valve unit of claim 1, wherein said control valve has a first control-valve connection connected to a pneumatic line which conducts pressure at least during the operation of the utility vehicle; a second control-valve connection connected to said holding-valve control connection; and, a third control-valve connection connected to said deaerator, wherein said control valve connects the second control-valve connection to the third control-valve connection in a de-energized state.

4. The electropneumatic parking-brake valve unit of claim 1, further comprising a holding-valve return line providing a pressure as a second control pressure (p2) at said holding-valve connection, wherein said second control pressure (p2) is controlled to said first bistable valve by said holding valve.

5. The electropneumatic parking-brake valve unit of claim 1, wherein said parking-brake valve arrangement comprises a pilot unit having the first bistable valve for providing at least a first pilot pressure (pS1) and having a main valve unit receiving said first pilot pressure (pS1) and controlling the spring brake pressure (pF) in accordance with receipt of said first pilot pressure (pS1).

6. The electropneumatic parking-brake valve unit of claim 5, wherein said pilot unit has a first 2/2-way valve associated with said first bistable valve and has a first 2/2-way valve connection connected to said first bistable valve and a second 2/2-way valve connection connected to said main valve unit for providing said first pilot pressure (pS1) at said main valve unit.

7. The electropneumatic parking-brake valve unit of claim 5, wherein the main valve unit includes: at least a first relay valve having a first relay-valve supply connection receiving said supply pressure (pV); a first relay-valve working connection connected to the spring brake connection; a first relay-valve deaeration connection connected to said deaerator; and, a first relay-valve control connection connected to said pilot unit and receiving the first pilot pressure (pS1).

8. The electropneumatic parking-brake valve unit of claim 1, further comprising a release connection for manually providing a release pressure (pL) for manually controlling said spring brake pressure (pF).

9. The electropneumatic parking-brake valve unit of claim 5, wherein said pilot unit has a second bistable valve for providing a second pilot pressure (pS2) at said main valve unit, wherein the main valve unit receives the second pilot pressure (pS2) and controls a trailer pressure (pT) at a trailer connection in accordance with the receipt of the second pilot pressure (pS2) for the purpose of releasing spring brakes of a trailer connected to the vehicle.

10. The electropneumatic parking-brake valve unit of claim 9, wherein said main valve unit has a second relay valve having a second relay-valve supply connection receiving the supply pressure (pV); a second relay-valve working connection connected to said trailer connection; a second relay-valve deaeration connection connected to said deaerator; and, a second relay-valve control connection connected to said pilot unit and receiving the second pilot pressure (pS2).

11. The electropneumatic parking-brake valve unit of claim 1, further comprising an electrically controlled pneumatic brake system to define a motor vehicle including said utility vehicle.

12. An electropneumatic parking-brake module comprising:

an electropneumatic parking-brake valve unit including:
at least a first supply connection for receiving supply pressure (pV) from a compressed air source;
at least one spring brake connection for connecting to at least one spring brake cylinder of the vehicle;
a parking-brake valve arrangement having at least a first bistable valve switchable between first and second switching states wherein a spring brake pressure (pF) can be controllable in dependence upon the switching state of said first bistable valve;
a pneumatically switchable holding valve having a holding-valve connection whereat a first control pressure (p1) is provided and said pneumatically switchable holding valve being connected between said first supply connection and said first bistable valve;
a deaerator;
said pneumatically switchable holding valve being pretensioned under a spring load into a first switching position wherein said first bistable valve is connected to said deaerator;
said first bistable valve being configured to switch into a second switching position when said first control pressure (p1) at said holding-valve connection exceeds a predetermined first threshold value;
wherein said first bistable valve is connected to said first supply connection to receive said supply pressure (pV) in response to being switched into said second switching position; and,
a multi-circuit protection valve unit connected upstream of said electropneumatic parking-brake valve unit in relation to the compressed air source wherein the multi-circuit protection valve unit provides the first control pressure (p1); and,
wherein said first control pressure (p1) is controlled by an electrically switchable control valve which is part of the electropneumatic parking-brake valve unit or is arranged remotely therefrom.

13. The electropneumatic parking-brake module of claim 12, wherein said electrically switchable control valve is a valve of the multi-circuit protection valve unit.

14. The electropneumatic parking-brake module of claim 12, wherein a trailer control unit is further integrated in the parking-brake module.

15. The electropneumatic parking-brake module of claim 12, further comprising an air-conditioning unit to provide an air conditioned module.

16. A method for operating an electronically controlled pneumatic brake system of a vehicle including a utility vehicle, having an electropneumatic parking-brake valve unit including: at least a first supply connection for receiving supply pressure (pV) from a compressed air source; at least one spring brake connection for connecting at least one spring brake cylinder of the vehicle; and, a parking-brake valve arrangement having at least a first bistable valve, wherein a spring brake pressure (pF) can be controlled at the spring brake connection in dependence upon a switching of the first bistable valve; the method comprising:

determining a fault in the brake system, which prevents switching of the first bistable valve;

deaerating the first spring brake connection for stopping the vehicle; and, connecting at least two connections of the first bistable valve to a deaerator for preventing an output of the spring brake pressure (pF) after deaeration of the spring brake connection has taken place.

* * * * *